United States Patent [19]

Raoux

[11] Patent Number: 4,701,760
[45] Date of Patent: Oct. 20, 1987

[54] METHOD FOR POSITIONING MOVING VEHICLES AND EXCHANGING COMMUNICATIONS BETWEEN THE VEHICLES AND A CENTRAL STATION

[75] Inventor: Daniel Raoux, Bonnelles, France

[73] Assignee: Commissariat a l'Energie Atomique, France

[21] Appl. No.: 708,259

[22] Filed: Mar. 5, 1985

[30] Foreign Application Priority Data

Mar. 7, 1984 [FR] France ............................. 84 03539

[51] Int. Cl.⁴ ............................................... G01S 1/02
[52] U.S. Cl. .................................... 340/993; 340/991; 342/396; 342/457; 364/449
[58] Field of Search ............... 340/939, 993, 988, 991; 343/6 R, 6 A, 7 VC, 386, 396, 457, 458; 367/99, 907; 364/460, 449; 342/396, 457, 458

[56] References Cited

U.S. PATENT DOCUMENTS

| | | | |
|---|---|---|---|
| 3,643,259 | 2/1972 | Entner | 364/449 |
| 3,644,883 | 2/1972 | Borman et al. | 340/991 |
| 3,711,856 | 1/1973 | Adrian et al. | |
| 3,774,211 | 11/1973 | Nard et al. | |
| 3,774,215 | 11/1973 | Reed | 343/458 |
| 3,803,610 | 4/1974 | Hastings et al. | 343/396 |
| 3,928,852 | 12/1975 | Barker | 343/396 |
| 3,941,983 | 3/1976 | Baker | 343/396 |
| 3,997,902 | 12/1976 | Nard | 343/396 |
| 4,077,005 | 2/1978 | Bishop | 343/357 |
| 4,107,689 | 8/1978 | Jellinek | 340/991 |
| 4,161,730 | 7/1979 | Anderson | 343/6 R |
| 4,229,737 | 10/1980 | Heldwein et al. | 343/458 |
| 4,276,552 | 6/1981 | Germany | 343/396 |

FOREIGN PATENT DOCUMENTS

| | | |
|---|---|---|
| 2853317 | 6/1980 | Fed. Rep. of Germany . |
| 1384940 | 2/1975 | United Kingdom ............... 340/991 |

OTHER PUBLICATIONS

"Loran Vehicle Location Systems" by J. Van Dewerker, Wescon Techn. Papers, vol. 20 (1976).
"Multiuser Area-Coverage Automatic Vehicle Monitoring Program" by D. J. Symes, IEEE Trans. on Vehicular Technology, vol. VT-26, No. 2 (May 1977).

Primary Examiner—Charles A. Ruehl
Assistant Examiner—Brent A. Swarthout
Attorney, Agent, or Firm—Michael N. Meller

[57] ABSTRACT

A method for monitoring vehicles from a central station, consisting of obtaining the approximate coordinates of each vehicle from signals transmitted by stations of the world omega network and using a vehicle-carried receiver. These approximate coordinates are corrected by reception and processing means, connected to fixed radiogoniometry beacons. Processing means connected to the vehicle-carried receiver supply the real coordinates of the vehicle to a vehicle-carried transmitter, the real coordinates being transmitted in coded form to a receiver of the central station. A bilateral sound communication between the station and the vehicles can be conducted by the communication means. Alarms on board vehicles can be transmitted to the station.

4 Claims, 2 Drawing Figures

METHOD FOR POSITIONING MOVING VEHICLES AND EXCHANGING COMMUNICATIONS BETWEEN THE VEHICLES AND A CENTRAL STATION

BACKGROUND OF THE INVENTION

The present invention relates to a method for positioning moving vehicles and for exchanging communications between these vehicles and a central station. It applies to the monitoring of the movement of vehicles carrying dangerous or precious materials over what can be a relatively vast territory.

This method permits a highly reliable, immediate transmission of different alarms occurring on each vehicle, particularly the stoppage, breakdown or exposure to hostile elements. The invention also permits a bilateral sound link between the vehicle and the central station. The latitude and longitude position of the vehicle is accurately known at all times and the distance covered from its starting point is indicated to the central station, which can store this data over a period of time.

At present, no very accurate method for monitoring the movements of vehicles is known. The best known method, which is unfortunately not very efficient, consists of transmitting to a central station the call signal of the vehicle, the distance covered by taking the mileage information from the vehicle gearbox, as well as possible alarms on board the vehicle. This method does not permit an accurate latitude and longitude positioning of the vehicle.

SUMMARY OF THE INVENTION

The object of the invention is to obviate these disadvantages, and more particularly to provide an efficient vehicle movement monitoring method. According to this method, each moving vehicle supplies to a transmission-reception and signal processing central station an identification code for the vehicle, the distance covered from a starting station, possible alarms on board the vehicle and very accurate coordinates of the vehicle marked in a latitude and longitude. This method also permits a bilateral sound connection between the central station and each of the vehicles being monitored.

The present invention specifically relates to a method for monitoring the movements of vehicles from a central transmission - reception and processing station consisting of marking the true coordinates of each vehicle in latitude and longitude, as well as the times at which each vehicle occupies these coordinates, said real coordinates being obtained by the automatic correction of approximate coordinates of the vehicle supplied by means carried by each vehicle permitting the reception and processing of position finding signals transmitted by stations of the world omega network, the transmission means carried supplying to the central station signals corresponding to the real coordinates, the automatic correction of the coordinates being carried out on the basis of correction signals supplied by correction receivers located in the vicinity of fixed radio navigation transmission beacons having known fixed latitude and longitude coordinates, the correction receiver in the vicinity of each beacon receiving the signals transmitted by the world omega network stations and processing said signals in order to calculate the differences between the approximate phases of the signals received from the world omega network and the real phases of these signals, correction signals being transmitted in the form of coded correction signals, on the carrier wave transmitted by the beacon, towards reception means carried by each vehicle, said transmission means transmitting to the central station the real coordinates of the vehicle, the reception and processing means of the central station supplying the real coordinates of the vehicle as a function of time, wherein the times corresponding to the coordinates of the vehicle are supplied by a high-precision transmitting clock, intercepted by the carried reception means, said clock synchronizing the transmission and reception means carried by the vehicles, the carried transmission means transmitting the sequences of signals having interleaved periods for the different vehicles.

According to another feature, by means of transmission means carried by each vehicle, the method makes it possible to supply to the central station coded signals indicating an identification number of the vehicle.

According to another feature, following each sequence of signals for each vehicle, there is a bilateral sound communication period between the vehicle and the central station and vice versa.

According to another feature, as a result of the transmission means carried by each vehicle, the method consists of supplying to the central station coded signals indicating possible alarms on board the vehicle.

According to another feature, as a result of transmission means carried by each vehicle, the method makes it possible to supply to the central station coded signals indicating the distance covered by the vehicle since it set out.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 1:
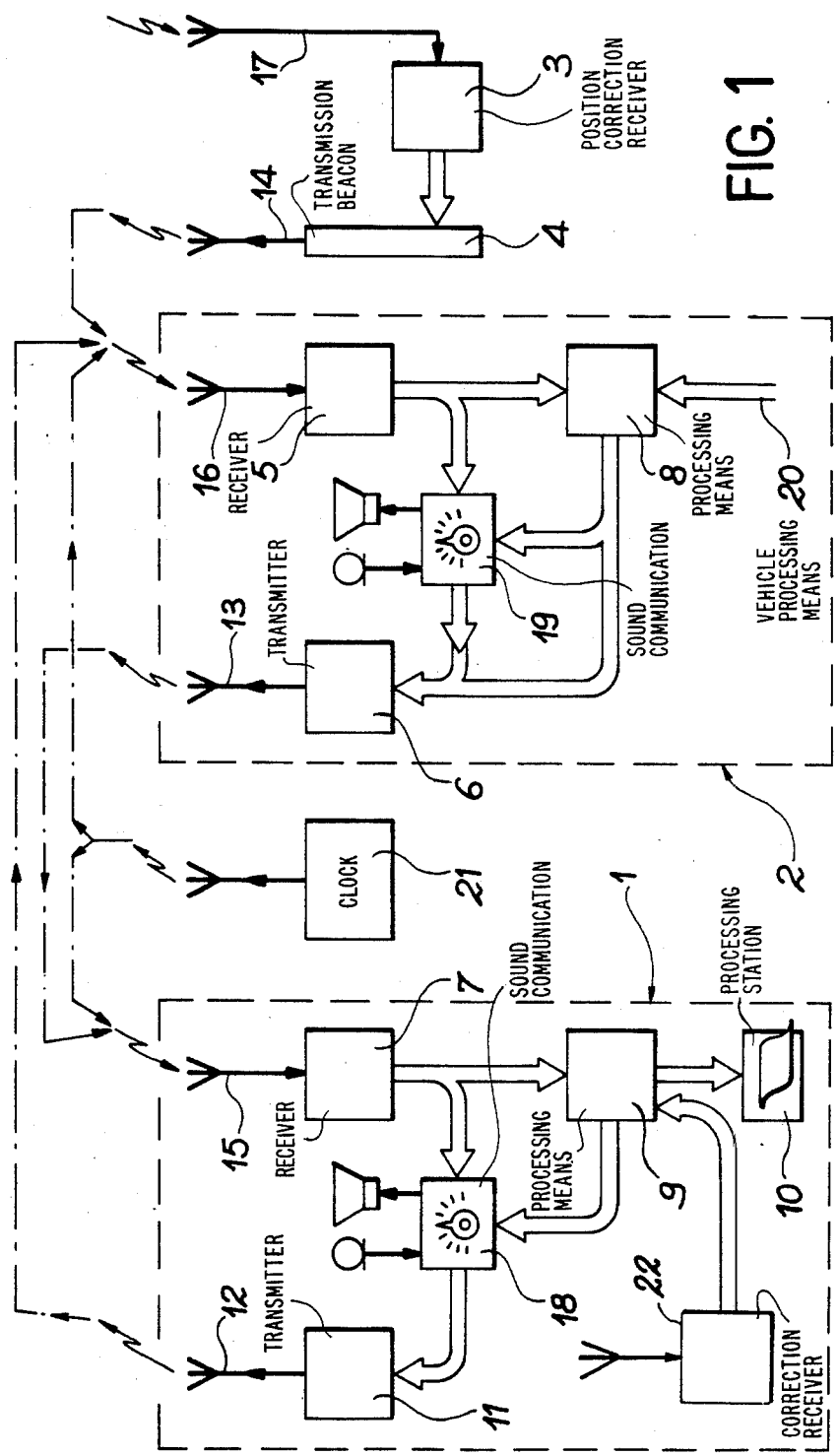
FIG. 1 shows diagrammatically a group of transmission and reception means located on board the vehicle, in the central station, as well as at different points of the territory over which the vehicle travels said means making it possible to realize the method according to the invention.

FIG. 1 diagrammatically shows the main means permitting the performance of the method according to the invention. These means are installed on board each vehicle, in the central station, as well as at different points in the territory over which the vehicles move and must be monitored. In a central transmission - reception and processing station 1, the method comprises marking the precise, real coordinates or positions of each vehicle in latitude and longitude, as well as the times at which the vehicle occupies these positions. This position is obtained by the automatic correction of the approximate positions occupied by each vehicle. The approximate positions, as well as their respective correction values are supplied by signal transmission -reception and processing means 2 carried by each vehicle. The means 2 make it possible, as will be shown hereinafter, to transmit to the central station and for each vehicle signals corresponding to the real coordinates of the vehicle, obtained on the basis of signals supplied by stations of the world omega network. The signals representing the automatic correction values of the coordinates come from a position correction receiver 3, located in the vicinity of each fixed transmission beacon of a system of radio navigation beacons. These beacons occupy fixed positions and their coordinates in longitude and latitude are very accurately known. A correction receiver 3, located in the vicinity of each beacon, receives the signals transmitted by stations of the world omega network and processes said signals in order to calculate the estimated position of the beacon, position being marked on the basis of transmissions from stations of the world omega network. The correction receiver 3 calculates the differences between the approximate phases and the real phases of the omega signals. The corresponding corrections signals are transmitted in code form on the carrier wave of the signals transmitted by the beacon to reception means 5 on board each vehicle. Vehicle-carried transmission means 6 transmit coded signals corresponding to the real coordinates of the vehicle obtained by means of the carried reception means 5 to the reception means 7 of the central station. The central station also has processing means 9. The vehicle-carried processing means 8 connected to the carried reception means 5 also make it possible to decode the signals received from the processing receivers 3 connected to the transmission beacons 4 and to encode the signals transmitted to the vehicle-carried transmitter 6 (corrected vehicle longitude and latitude positions). In the central station, the processing means 9 connected to the reception means 7 of station 1 make it possible to decode the signals from the carried transmission means 6. These processing means have outputs which can be connected, for example, to a printer 10, making it possible to display over a period of time the displacements of the vehicles. The central station 1 also comprises a transmission means 11, whose function will be defined in greater detail hereinafter. In FIG. 1, numerals 12, 13 and 14 designate the antennas respectively connected to the transmission means 11 of the central station, to the vehicle-carried transmission means 6 and to each transmitting beacon 4. Numerals 15, 16, 17 designate the reception antennas respectively connected to the reception means 7 of the central station, to the vehiclecarried reception means 5 and to the reception and processing means 3 connected to beacons 4.

The reception means 7 and transmission means 11 of the central station are connected to a bilateral sound communications system 18. In the same way, the vehicle-carried transmission -reception means 5, 6 are connected to a bilateral sound communication means 19. These sound communications means permit, under conditions which will be described in greater detail hereinafter, the establishment of sound communications between each vehicle and the central station, during predetermined periods and on predetermined frequencies.

The world omega network is a world radio navigation system enabling e.g. ships and aircraft to find their positions on the basis of phase measurements of signals transmitted by eight stations distributed around the earth. This system completely complies with the criteria which international experts call for, particularly for the worldwide position finding of ships and aircraft. However, its precision is not perfect, being roughly 5 nautical miles. Thus, this position finding system is inadequate for land vehicles transporting dangerous or precious materials, whose positions must be marked much more accurately. As in any phase measurement system, the combination of signals from transmission stations of the world omega network determine families of hyperbolas enabling a navigator to position himself on the basis of special maps. The automatic receivers directly display the latitude and longitude position with the aforementioned inaccuracy. The latter is essentially due to the interference in the propagation at very low frequencies of the position finding signals to be transmitted by the transmission stations of the world omega network. This interference is essentially due to the conductivity of the ground (earth, sea or ice), the height of the ionized layer of the atmosphere, the effects of solar radiation, etc. This interference leads to real transit times of waves differing very greatly from those normally corresponding to the distances separating a receiver from the transmission stations. Thus, corrections must be made to the latitude and longitude values obtained by the reception of signals from the world omega network. These corrections can be made either with the aid of special precalculated tables, which take a long time to use and which do not permit a real time position finding, or by the use of a complex process consisting of determining the most probable correction on the basis of processing carried out on measurements from the three world omega frequencies (10.2, 13.6 and 11.33 kHz). The coordinates of one point on the basis of the world omega network are obtaiend by processing phases of signals from stations of said network. As a result of the interference referred to hereinbefore, the phases obtained are approximate and the coordinates of the point are consequently also approximate.

The method according to the invention makes it possible to carry out these corrections in real time, by reception and processing means located in the vicinity of radionavigation beacons, located in the territory over which the vehicles to be monitored are moving. These radio navigation beacons normally enable ships to find their bearings by radiogoniometry and in France are located close to the coasts. They transmit signals in the frequency range from 285 to 425 kHz. In order to improve the coverage of French territory by said beacons, a land beacon has been equipped with the aforementioned correction means.

The correction receivers connected to each beacon receive the signals from the world omega network and observe the differences between the real phases and the approximate phases of these signals. It is then possible by using the processing means of said receivers to calculate the corrections to be made to the approximate positionings of the vehicles obtained by the processing of signals from the world omega network. These coded correction signals which, at all times, indicate the positioning errors (latitude and longitude coordinates) obtained on a given territory covered by the beacons, enable any vehicle defining its position on the signals of the world omega network to find its real or corrected position. As stated hereinbefore, these coded correction signals are transmitted on the carrier wave of signals from beacons in the direction of the reception means 5 of each vehicle.

The vehicle-carried reception means 5 receive said signal, correct the approximate position for obtaining the real or corrected position (latitude and longitude coordinates) and, after a possible code conversion by processing means 8, transmit signals representing said real position to the transmission means 6. The reception means 5 also receive signals supplied by a high-precision transmitting clock 21. The latter makes it possible to synchronize the vehicle-carried transmission and reception means, as well as the transmission and reception means of the monitoring station. It also makes it possible to accurately define the time at which each vehicle transmitted coded signals. It synchronizes the clock on board the vehicle (not shown). Finally, as will be shown in greater detail hereinafter, the clock 21 makes it possible to determine interleaved transmission and reception signal periods between the different vehicles. The vehicle-carried processing means 8 also make it possible to code signals received on inputs 20 and which can, for example, represent the identification number of the vehicle, as well as alarms occurring on said vehicle. These alarms can be an abnormal stopping of the vehicle, the absence of an identification number as a result of the nonintroduction of a safety key into the vehicle alarm system, the possible uncoupling of a trailer connected to said vehicle, etc. These coded identification and alarm signals are transmitted to the vehicle-carried transmission means 6 and are transmitted to the reception means 7 of central station 1. Means 18, 19 making it possible to establish bilateral sound communications between each vehicle and the central station are controlled by respective processing means 8, 9, as a function of predetermined bilateral sound transmission and reception frequencies chosen for each vehicle. These bilateral sound communications can be established after each sequence of signals are transmitted by the vehicles to the central station. As the transmission periods of these signals are interleaved for the different vehicles, it is obviously necessary for the processing means 8 and 9 of the central station and the vehicles, which are synchronized by the signals of clock 21, to intervene in order to indicate the possible sound communication periods in a manner to be described hereinafter. Each vehicle also transmits at all times the distance traveled from the vehicle starting point on the basis of information supplied by the odometer carried by each vehicle.

The central station also comprises a correction receiver 22, identical to that located in the vicinity of each beacon, which is used for carrying out the aforementioned corrections in case of a failure of a correcton receiver close to a beacon. An alarm can be given when such a failure takes place.

Figure 2:
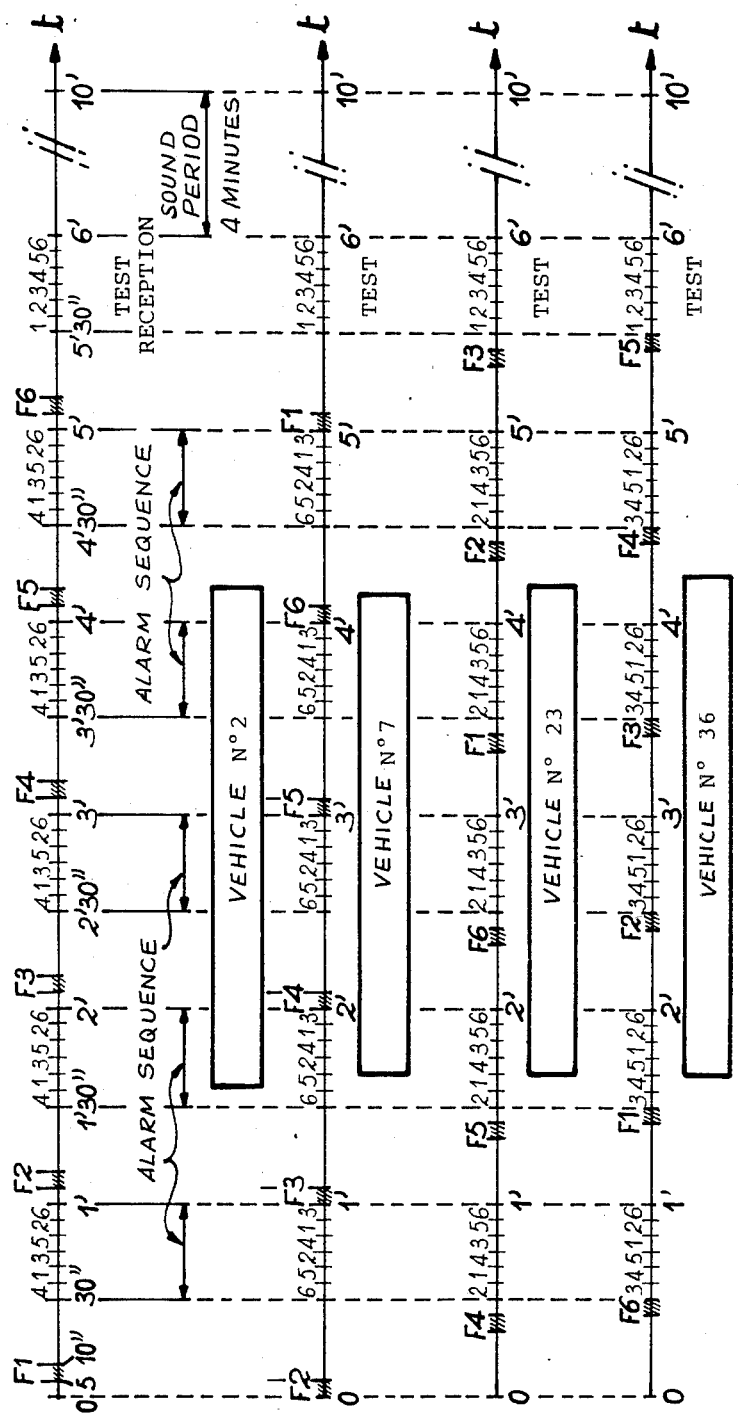
FIG. 2 shows a timing diagram providing a better understanding of the interleaving or interconnection of the transmission -reception signals exchanged between each of the vehicles being monitored and the central station during the realization of the method according to the invention.

FIG. 2 is a timing diagram of the signals transmitted by the different vehicles to the central station. In said timing diagram, it is assumed that the central station must monitor 36 vehicles. For each vehicle, the timing diagram extends over a time t of 10 minutes and it is assumed that the monitored vehicles are 2, 7, 23 and 36. On considering, for example, the monitored vehicle 2, references F1, F2, F3, F4, F5, F6 designate the frequencies at which the signals indicating the positions of said vehicle are transmitted, the identification number of the vehicle, the distance covered and the various alarms. For this vehicle, the frequency signals F1, F2, F3, F4, F5 and F6 are transmitted to the reception means of the central station respectively between 5 and 10 seconds, between 65 and 70 seconds, between 125 and 130 seconds, between 185 and 190 seconds, between 245 and 250 seconds, and between 305 seconds and 310 seconds. Possible alarm sequences are then transmitted respectively between 30 and 60 seconds, between 90 and 120 seconds, between 150 and 180 seconds, between 210 and 240 seconds, and between 270 and 300 seconds. Finally, a test sequence of the vehicle reception means can be transmitted between 330 and 360 seconds. For this vehicle, as well as for all other vehicles, a bilateral sound communication period with the central station (lasting 4 minutes) is provided between 6 and 10 minutes. The central station indicates to the vehicle in question, using its transmission means 11, the frequency on which the bilateral sound communication is to take plate. In the sequences of alarms, numbers 4, 1, 3, 5, 2, 6, for example, designate the order of the frequencies.

As indicated hereinbefore, the vehiclecarried transmission means 6, controlled by the processing means 8 synchronized by clock 21, transmit interleaved period signal sequences. Thus, for example, vehicle 7 successively transmits the positioning signals on the successive frequencies F2, F3, F4, F5, F6, F1. These signals are respectively transmitted between 0 and 5 seconds, between 60 and 65 seconds, between 120 and 125 seconds, between 180 and 185 seconds, between 240 and 245 seconds, and between 300 and 305 seconds. The sequences of alarms are transmitted at the same times as for vehicle 2, but with a different code, which is, for example, 652413. The test sequence is also transmitted at the same times as for vehicle 2. The sound communication period also takes place between the same times as for vehicle 2. A detailed description will not be provided of the signals provided by the two other vehicles, which are, for example, 23 and 36. Reference is merely made to the interleaving of the transmission signals transmitted by these vehicles.

The method according to the invention makes it possible to achieve the aforementioned objective, namely the strict positioning of vehicles by corrections of the approximate instantaneous positions of each vehicle, the transmission of alarm sequences, as well as the possibility of bilateral sound communications

What is claimed is:

1. A method for monitoring the movements of vehicles from a central transmission-reception and processing station, comprising marking the real coordinates of each vehicle in latitude and longitude, as well as the times at which each vehicle occupies these coordinates, said real coordinates being obtained by an automatic correction of approximate coordinates of the vehicles, these real coordinates being supplied by processing means carried by each vehicle, for receiving and processing position finding signals transmitted by stations of the world omega network, vehicle-carried transmission means being capable of transmitting to the central station signals corresponding to the real coordinates, the automatic correction of the coordinates being carried out on the basis of signals supplied by correction receivers, the correction receivers being located in the vicinity of fixed radio navigation transmission beacons occupying fixed positions with known latitude and longitude coordinates, the correction receiver in the vicinity of each beacon receiving the signals transmitted by stations of the world omega network and processing these signals in order to calculate the differences between the real phases and the approximate phases of the world omega network signals received at said known fixed positions of the beacons, these differences being transmitted in the form of coded correction signals, on a carrier wave transmitted by each beacon, to the reception means carried by each vehicle, the vehicle-carried transmission means transmitting to the central station the real coordinate signals of the vehicle reception means and processing means of the central station supplying the real coordinates of the vehicles upon the reception of the signals from the transmission means of the vehicles, wherein the time corresponding to each vehicle position is supplied by a high-precision, transmitting clock, intercepted by the vehicle-carried reception means, said clock synchronizing the transmission and reception means carried by the vehicles, the vehicle-carried transmission means transmitting sequences of interleaved signals for the different vehicles, further comprising the step of transmitting coded signals indicating a vehicle identification number to the central station using a transmission - reception means carried by each vehicle, wherein coordinate corrections are carried out in the central station, which also incorporates a coordinate correction receiver for carrying out said corrections in the case of a failure of the correction receiver located in the vicinity of a beacon, an alarm being provided to indicate said failure.

2. A method according to claim 1, wherein after each signal sequence there is a bilateral sound communication period between the vehicle and the central station and vice versa for each individual vehicle.

3. A method according to claim 1, further comprising the step of transmitting to the central station coded signals indicating possible alarms on board the vehicle using vehicle-carried transmission-reception means.

4. A method according to claim 1, further comprising the step of transmitting to the central station coded signals indicating the distance traveled by the vehicle since its departure, these coded signals being transmitted by the vehicle-carried transmission - reception means.

* * * * *